May 12, 1925.
F. S. CARR
STUD
Filed Dec. 15, 1919
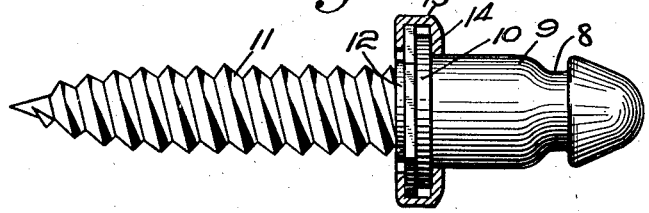
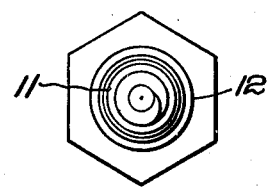
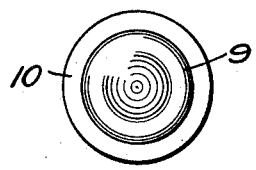
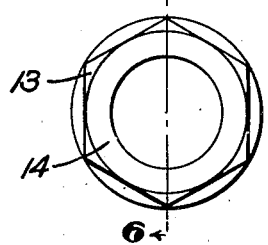
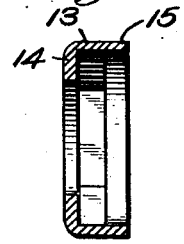
Inventor:
Fred S. Carr,
by Emery Booth Janney + Varney.
Attys.

Patented May 12, 1925.

1,537,798

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

STUD.

Application filed December 15, 1919. Serial No. 344,787.

*To all whom it may concern:*

Be it known that I, FRED S. CARR, a citizen of the United States, and a resident of Newton, in the county of Middlesex and Commonwealth of Massachusetts, have invented an Improvement in Studs, of which the following description, in connection with the accompanying drawings, is a specification, like characters on the drawings representing like parts.

This invention pertains to improvements in studs for use in connection with fasteners, and more particularly, though not exclusively, to a screw stud threaded either for wood or metal for entrance into the body of an automobile or the like, and having a head portion of any desired formation adapted to cooperate with the socket of a snap fastener.

In the drawings:—

Fig. 1 is a side elevation of a preferred form of screw stud made in accordance with one embodiment of my invention;

Fig. 2 is a view similar to Fig. 1, partly in section, showing the detail of a preferred means for securing together the head portion of the stud and the screw portion thereof;

Fig. 3 is an end elevation of the screw portion of the stud;

Fig. 4 is an end elevation of the head portion of the stud;

Fig. 5 is an end elevation of a preferred form of connecting element for securing the body of the stud and the screw thereof together; and Fig. 6 is a sectional view partly in elevation of the part shown in Fig. 5, prior to assembly with its cooperating parts.

Referring to the drawings and to the preferred embodiment of my invention selected for illustrative purposes, 7 is the head of a snap fastener stud having a neck 8 and shank portion 9 provided with a flange 10, which may be circular as illustrated. The stud portion, including the parts 7, 8, 9 and 10, is preferably made of solid brass, and may conveniently be manufactured in an automatic screw machine. Cooperating with the parts hereinbefore described is a screw portion 11, preferably made of iron or steel and provided with an integral head 12 which may be of hexagonal shape, as shown, or of any other desired contour, but which preferably is not round. The brass stud portion and the steel screw portion are held together in the preferred form of my invention by a collar portion 13 having a flange 14 adapted to engage above the flange 10 of the stud, and a lip 15 adapted to be rolled or crimped beneath the head 12 of the steel screw. That portion of the collar 13 surrounding the head 12 of the steel screw 11 and preferably that portion thereof surrounding the flange 10 of the stud proper are preferably made of a shape corresponding to the shape of the head of the screw 12, preferably being hexagonal so that a wrench engaging the exterior of the collar 13 will turn the stud 11 without danger of slippage between the collar and the screw; while lip 15 is initially circular as shown in Fig. 6.

The preferred form of my invention shown in the drawings and hereinbefore described, permits the use of a solid head stud, which is much stronger than a hollow stud, and which is not likely to rust, as is the case where the stud is of steel, and at the same time permits the use of a steel screw portion which is not likely to break or twist off as is a brass or other non-corrosive screw portion where the stud portion and screw portion are made integral and of non-corrosive materials. All the advantages of a solid brass stud and of a steel screw are availed of in one and the same combination.

A solid stud is particularly useful where attached to the body or other rigid portion of the machine, because the strain on the stud is much greater where fastened to a rigid part than where cooperating studs and sockets are both secured to flexible elements such as curtains. For the latter use, a hollow stud is satisfactory, but where the stud is secured to a rigid part of a machine, that portion of the stud adjacent the neck which is weakened by rolling is likely to break. My present invention overcomes all of the disadvantages mentioned above.

While I have shown and described a preferred embodiment of my invention, it will be understood that changes involving omission, substitution, alteration and reversal of parts may be made without departing from the scope of my invention, which is best defined in the following claims.

Claims:

1. A three-piece screw stud providing a screw having a polygonal head, a stud having a base, and a connecting collet presenting a preformed flange for engagement over said base of said stud, a preformed polygonal portion extending over both said head and said base, and a post assembly crimped flange beneath said head formed from an initially round flange underlying said polygonal portion.

2. A collet for uniting a stud head to a screw fastener comprising a hollow metallic body having an inturned annular flange at one end, said flange providing a circular aperture to pass the stud head, said body being polygonal exteriorly and interiorly for a portion of its length and circular for the remainder of its length, the circular portion providing a readily crimped part designed to fit under the head of the screw fastener.

In testimony whereof, I have signed my name to this specification.

FRED S. CARR.